United States Patent
Hwang et al.

(10) Patent No.: US 9,305,326 B2
(45) Date of Patent: Apr. 5, 2016

(54) APPARATUS AND METHOD FOR TILE ELIMINATION

(71) Applicant: INDUSTRIAL TECHNOLOGY RESEARCH INSTITUTE, HsinChu (TW)

(72) Inventors: Tsung-Ling Hwang, Hsinchu (TW); Shau-Yin Tseng, Hsinchu County (TW); Tai-Hua Lu, Taichung (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 243 days.

(21) Appl. No.: 14/141,191

(22) Filed: Dec. 26, 2013

(65) Prior Publication Data

US 2015/0187123 A1    Jul. 2, 2015

(51) Int. Cl.
*G06T 15/00* (2011.01)
*G06T 1/20* (2006.01)

(52) U.S. Cl.
CPC .................. *G06T 1/20* (2013.01); *G06T 15/005* (2013.01)

(58) Field of Classification Search
CPC ....... G06T 1/20; G06T 15/005; G06F 3/0608; G06F 12/0866
USPC .................. 345/419, 421, 422, 426; 707/692; 711/100, 103, 114
See application file for complete search history.

(56) References Cited

U.S. PATENT DOCUMENTS

| | | | |
|---|---|---|---|
| 6,380,935 B1 | 4/2002 | Heeschen et al. | |
| 1,007,476 A1 | 3/2011 | Oterhals et al. | |
| 1,014,891 A1 | 6/2011 | Heggelund et al. | |
| 8,044,951 B1 | 10/2011 | Brown et al. | |
| 8,195,878 B2 * | 6/2012 | Mittendorff | G06F 12/0866 711/100 |
| 8,204,867 B2 * | 6/2012 | Benhase | G06F 3/0608 707/692 |
| 8,269,775 B2 | 9/2012 | Bourd et al. | |
| 8,310,491 B2 | 11/2012 | Swift et al. | |
| 8,392,791 B2 * | 3/2013 | Saliba | G06F 3/0608 707/692 |

(Continued)

FOREIGN PATENT DOCUMENTS

| | | |
|---|---|---|
| TW | I240224 B | 9/2005 |
| TW | I371979 | 9/2012 |
| TW | 201337733 A | 9/2013 |

OTHER PUBLICATIONS

How low can you go? Building low-power, low-bandwidth ARM Mali GPUs; Tom Olson; Web Page; Aug. 17, 2012;http://blogs.arm.com/multimedia/780-how-low-can-you-go-building-low-power-low-bandwidth-arm-mali-gpus/.

(Continued)

*Primary Examiner* — Phu K Nguyen
(74) *Attorney, Agent, or Firm* — Rabin & Berdo, P.C.

(57) ABSTRACT

An exemplary embodiment describes a method for tile elimination, including: reading in data of a new tile; reading signature values corresponding to the new tile from a signature value repository; generating signature values for the new tile; comparing the read signature values and the generated signature values of the same tile to determine whether the two sets of signature values being identical; when the two sets of signature values being identical, copying the new tile directly from a tile frame buffer without rendering; otherwise, updating the signature value repository with the generated signature values replacing the stored signature values; rendering the tile; and updating the tile frame buffer with the newly rendered tile.

16 Claims, 6 Drawing Sheets

(56) References Cited

U.S. PATENT DOCUMENTS

| | | | |
|---|---|---|---|
| 9,152,894 B2* | 10/2015 | Qian | G06K 15/1813 |
| 2007/0083815 A1 | 4/2007 | Delorme et al. | |
| 2011/0055471 A1* | 3/2011 | Thatcher | G06F 3/0608 |
| | | | 711/114 |
| 2011/0102446 A1 | 5/2011 | Oterhals et al. | |
| 2012/0044245 A1 | 2/2012 | Diril et al. | |
| 2012/0176386 A1 | 7/2012 | Hutchins | |
| 2012/0236011 A1 | 9/2012 | Diesi | |
| 2012/0268480 A1 | 10/2012 | Cooksey et al. | |
| 2013/0318288 A1* | 11/2013 | Khan | G06F 3/0608 |
| | | | 711/103 |

OTHER PUBLICATIONS

Fragment Reduction on Mobile GPU With Content Adaptive Sampling; Chia-Yang Chang, Yu-Jung Chen, Chia-Ming Chang, Shao-Yi Chien; IEEE International Conference on Multimedia and Expo Workshops; Jul. 2012; p. 629-634.

Deferred Rendering; Imagination Technologies Ltd; POWERVR Series5 Graphics SGX architecture guide for developers; Jul. 2011; p. 5.

Depth-Fighting Aware Methods for Multifragment Rendering; Andreas-Alexandros Vasilakis, Ioannis Fudos; IEEE Computer Society; Jun. 2013; vol. 19, No. 6.

Adaptive Frameless Rendering; Abhinav Dayal, Cliff Woolley, Benjamin Watson, David Luebke; SIGGRAPH '05 ACM SIGGRAPH 2005 Courses; Jul. 2005; Article No. 24.

Decoupled Sampling for Graphics Pipelines; Jonathan Ragan-Kelley, Jaakko Lehtinen, Jiawen Chen, Michael Doggett, Frédo Durand; ACM Transaction on Graphics; Mar. 2011; vol. 30, No. 3, Article 17.

Computation-Effective 3-D Graphics Rendering Architecture for Embedded Multimedia System; Bor-Sung Liang, Chein-Wei Jen; IEEE Transactions on Consumer Electronics; Aug. 2000; vol. 46, No. 3 p. 735-p. 743.

Taiwan Patent Office, Office Action, Patent Application Serial No. TW103110529, Oct. 20, 2015, Taiwan.

* cited by examiner

| SIGNATURE TYPE | SIGNATURE VALUE |
|---|---|
| CLS | |
| SLS | |
| OLS | |
| PLS | |
| TLS | |
| SS | |

FIG. 3

| SIGNATURE TYPE | SIGNATURE VALUE |
|---|---|
| CL-Command | |
| CL-State | |
| SL-Lighting | |
| SL-Transform | |
| SL-Tile Data | |
| OL-Coloring | |
| PI-Vertex Coordinates | |
| PL-Normal Coordinates | |
| TL-Texture ID | |
| TL-Texture Address | |
| SS | |

401 CL-Command
402 CL-State
403 SL-Lighting
404 SL-Transform
405 SL-Tile Data
406 OL-Coloring
407 PI-Vertex Coordinates
408 PL-Normal Coordinates
409 TL-Texture ID
410 TL-Texture Address
411 SS

APPARATUS AND METHOD FOR TILE ELIMINATION

TECHNICAL FIELD

The technical field generally relates to an apparatus and method for tile elimination.

BACKGROUND

Graphics Processing Unit (GPU) now possesses the capability to render images of giga-byte magnitude. As the trend of computer graphics moves towards higher-resolution display, such as, 4K×4K, and complex rendering, the capability of computation and bandwidth of interface between GPU and system is critical. However, for handheld devices, possessing powerful computation capability and large bandwidth is not realistic because of huge power consumption. The tile-based rendering technique, wherein a frame is divided into a plurality of tiles for rendering, is proposed to help GPU in better exploring the locality of memory access, utilizing efficient use of traffic bandwidth and better scheduling of shader computation to achieve better performance.

Figure 1:
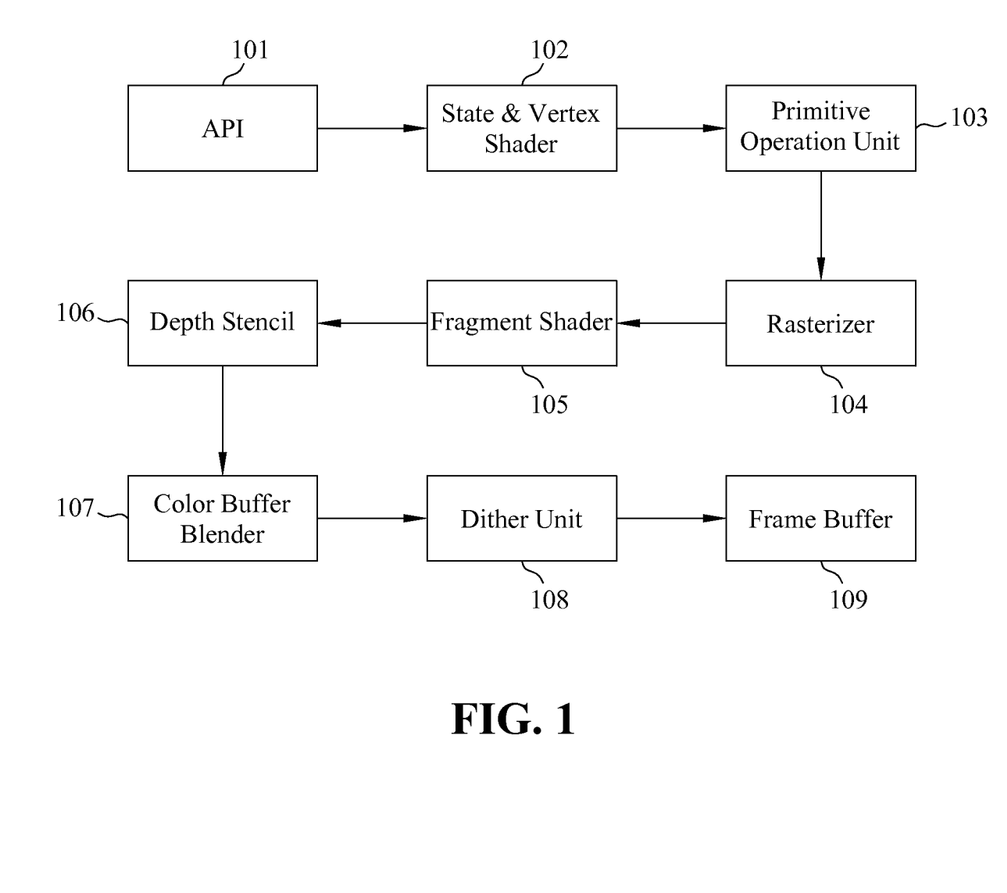
FIG. 1 shows a schematic view of the structure of an apparatus realizing the GPU rendering pipeline in known technique.

FIG. 1 shows a schematic view of the structure of an apparatus realizing the GPU rendering pipeline in known technique. As shown in FIG. 1, the apparatus includes an application programming interface (API) 101, a state and vertex shader 102, a primitive operation unit 103, a rasterizer 104, a fragment shader 105, a depth stencil 106, a color buffer blender 107, a dither unit 108 and a frame buffer 109.

Other techniques, such as, scheduling graphic commands based on property and function, dispatching the commands to respective hardware and collecting the result in display driver, and by using a sampling mechanism and utilizing previously rendered and sampled pixels to reconstruct a new frame are also proposed.

SUMMARY

An exemplary embodiment describes an apparatus utilizing tile elimination, comprising a front portion pipeline module, a tile-elimination module, a back portion pipeline module, all connected in a pipeline manner, wherein the tile-elimination module further includes a tile engine, a signature value computation unit, a signature value repository and a tile comparison unit; wherein the tile engine is connected to the primitive operation unit; the signature value computation unit is connected to API, state and vertex shader, primitive operation unit and tile engine for computing signature values; the signature value repository is connected to the signature value computation unit for storing the signature values computed by the signature value computation unit; and the tile comparison unit is connected to the tile engine and the signature value repository for comparing signature values of a tile of the current frame and the same tile of the previous frame, and for accessing signature values of tiles stored in the signature value repository; the tile comparison unit being also connected to the frame buffer and responsible for determining whether to proceed to render the tile or to signal the frame buffer to copy the previously rendered tile and eliminate the rendering of the tile.

Another embodiment describes a method for tile elimination, comprising: reading in data of a new tile; reading signature values corresponding to the new tile from a signature value repository; generating signature values for the new tile; comparing the read signature values and the generated signature values of the same tile to determine whether the two sets of signature values being identical; when the two sets of signature values being identical, copying the new tile directly from a tile frame buffer without rendering; otherwise, updating the signature value repository with the generated signature values replacing the stored signature values; rendering the tile; and updating the tile frame buffer with the newly rendered tile.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
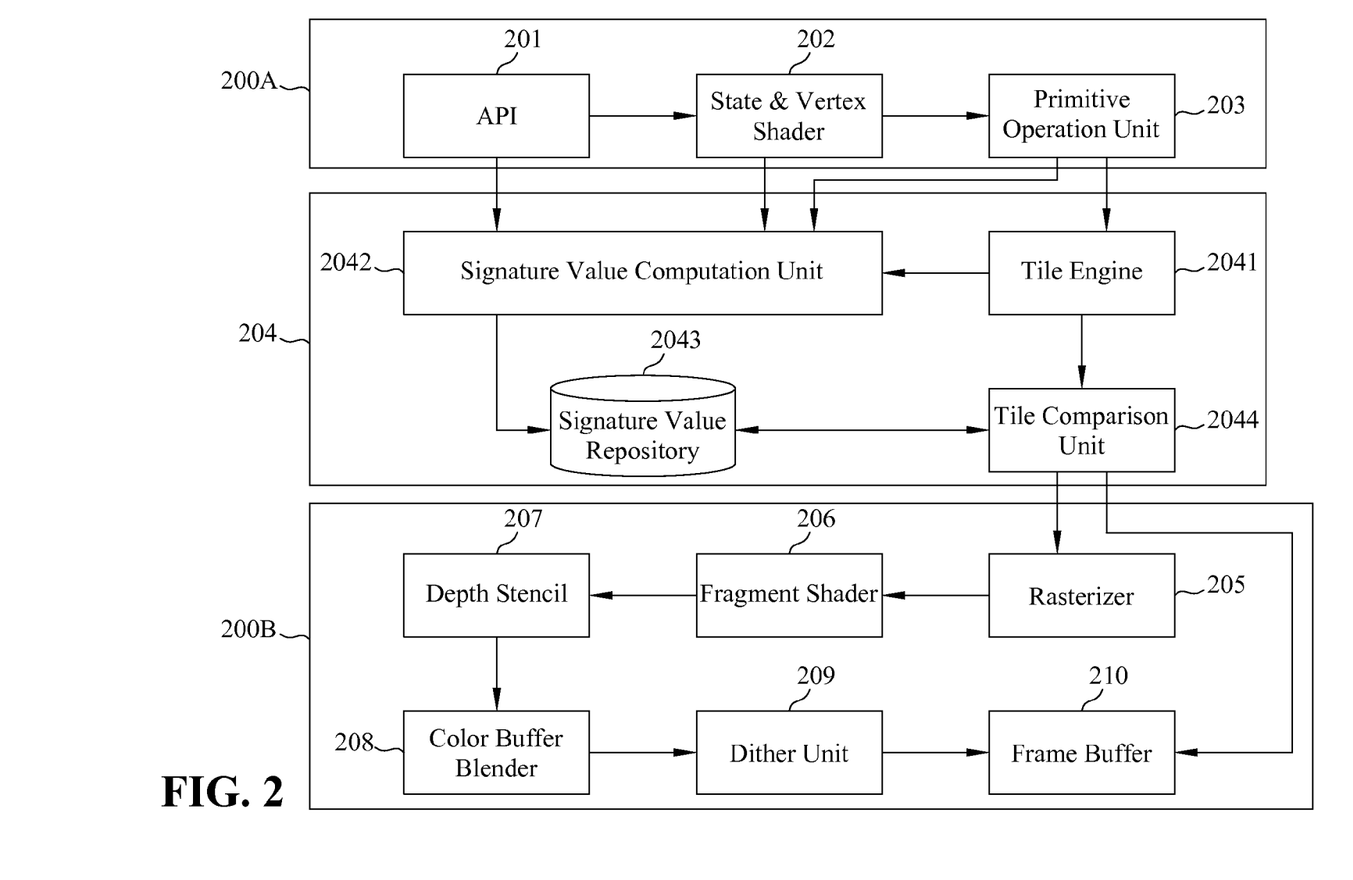
FIG. 2 shows a schematic view of the structure of an apparatus realizing the GPU rendering pipeline utilizing tile elimination according to an exemplary embodiment.

FIG. 2 shows a schematic view of the structure of an apparatus realizing the GPU rendering pipeline utilizing tile elimination according to an exemplary embodiment of the present disclosure. The apparatus of the exemplary embodiment is to insert a tile elimination module into a GPU rendering pipeline having a front portion pipeline module 200A and a back portion pipeline module 200B, wherein the front portion pipeline module 200A further includes an application programming interface 201, a state and vertex shader 202, and a primitive operation unit 203; and the back portion pipeline 200B further includes a rasterizer 205, a fragment shader 206, a depth stencil 207, a color buffer blender 208, a dither unit 209 and a frame buffer 210. As shown in FIG. 2, the apparatus includes an application programming interface (API) 201, a state and vertex shader 202, a primitive operation unit 203, a tile-elimination module 204, a rasterizer 205, a fragment shader 206, a depth stencil 207, a color buffer blender 208, a dither unit 209 and a frame buffer 210, wherein the application programming interface (API) 201, state and vertex shader 202, primitive operation unit 203, rasterizer 205, fragment shader 206, depth stencil 207, color buffer blender 208, dither unit 209 and frame buffer 210 are the same as the application programming interface (API) 101, state and vertex shader 102, primitive operation unit 103, rasterizer 104, fragment shader 105, depth stencil 106, color buffer blender 107, dither unit 108 and a frame buffer 109 in FIG. 1. In other words, the tile-elimination module 204 is added to the conventional GPU rendering pipeline between the primitive operation unit 203 and the rasterizer 205 to utilize existing parameters and data in the GPU to compute signature values and to determine whether the current tile rendering can be omitted.

As shown in FIG. 2, the tile-elimination module 204 further includes a tile engine 2041, a signature value computation unit 2042, a signature value repository 2043 and a tile comparison unit 2044; wherein the tile engine 2041 is connected to the primitive operation unit 203 to receive results from the primitive operation unit 203 and to generate a list of arrays indicating the processing elements to be rendered on a tile basis; the signature value computation unit 2042 is connected to API 201, state and vertex shader 202, primitive operation unit 203 and tile engine 2041 for computing signature values based on the data and parameters from the API 201, state and vertex shader 202, primitive operation unit 203 and tile engine 2041; the signature value repository 2043 is connected to the signature value computation unit 2042 for storing the signature values computed by the signature value computation unit 2042; and the tile comparison unit 2044 is connected to the tile engine 2041 and the signature value repository 2043 for comparing signature values of a tile of the current frame and the same tile of the previous frame, and for accessing signature values of tiles stored in the signature value repository 2043; the tile comparison unit 2044 is also connected to the frame buffer 210 and responsible for determining whether to proceed to render the tile or to signal the frame buffer 210 to copy the previously rendered tile and eliminate the rendering of the tile.

It should be noted that the signature value computation unit 2042 may be implemented as a streaming signature value generator utilizing some signature generation algorithm, such as, but not limited to, cyclic redundancy check (CRC), cryptographic hash algorithms MD5, SHA, and so on. The parameters and data existing in the GPU that may be used in computing includes, such as, but not restricted to, API count, API state changes, lighting matrix, texture coordinates, viewports, transformation matrix, color index, normal coordinates, texture ids, texture address, and so on.

Furthermore, the tile comparison unit 2044 compares the signature values of a tile in the current frame (computed by the signature value computation unit 2042) and the signature values of the same tile in the previous frame (read from signature value repository 2043). When the respective signature values are the same between current frame and previous frame, the tile is not rendered. Instead, the previously rendered tile is copied from the frame buffer and used. On the other hand, when the respective signature values are different for the tile in the two frames, the tile comparison unit 2044 proceeds to continue the rendering process in the pipeline, i.e., passing data to the rasterizer 205. When the tile in the current frame is rendered, the same tile in the previous frame is discarded from the frame buffer.

Figure 3:
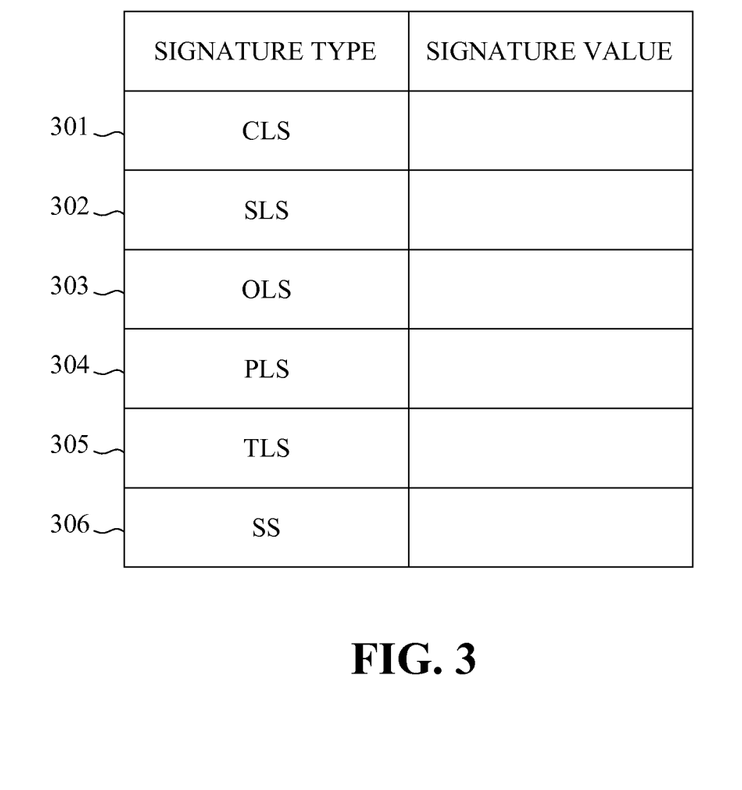
FIG. 3 shows a schematic view of a storage scheme for the signature value repository according to an exemplary embodiment.

The signature value repository 2043 is not restricted to any specific implementation as long as the stored signature values are tile-based. FIG. 3 shows a schematic view of a storage scheme for the signature value repository according to an exemplary embodiment. As shown in FIG. 3, the signature values of a tile is stored as a plurality of <SIGNATURE TYPE, SIGNATURE VALUE> pairs. In the present embodiment, five signature types are defined and computed for each tile, including: a command level signature (CLS) 301, a scene level signature (SLS) 302, an object level signature (OLS) 303, a composer level signature (PLS) 304 and a texture level signature (TLS) 305. In general, a level is defined as an equal or similar effect or function that would affect the rendering pipeline of GPU. The definitions of each of the five level signatures are described as follows:

Command Level Signature (CLS): the CLS represents the command level characteristics. The command level refers to data and signals that would affect the entire rendering process, such as, graphics library (GL) command. For example, GL API is fed into the computer graphics device through high level computing components like software compiler and driver. The number of GL API, the state of GL API and the indication of change of the shader program passes through the signature value computation unit 2042 to generate one or more signature values of CLS type.

Scene Level Signature (SLS): the SLS represents scene level characteristics. The scene level refers to data or signals that would affect the rendering of the entire scene from the viewers perspective, such as, the final projection of the view, final lighting effect, and so on. For example, the transformation and lighting in GL API provides scene level information which would affect the scene and the rendered frames. Transformation, such as, coordinate transformation, the relation between scene and object, and lighting, such as, direct lighting, ambient lighting, diffuse lighting, specular lighting, emission lighting and related lighting states (i.e., number of light, strength of light, color of light) are some of the scene level information. It should be noted that additional data, such as, a triangle list and a triangle count generated, both generated by the tile engine 2041 in the present embodiment, may also be included in the SLS.

Object Level Signature (OLS): the OLS represents object level characters. The object level refers to data or signals that would affect a graphic object, such as, the state of the object, the characteristic value of the object, the color of the object, and so on. For example, an object may be viewed as an enclosure of drawing command, or drawing object in GL. In the present embodiment, the OLS also includes coloring information, such as, fog, fog mode, fog and fog density, and a primitive list related to the object.

Composer Level Signature (PLS): the PLS represents composer level characteristics. The composer level refers to data or signals indicating a list of vertices. For example, the vertices are the descriptions to define the boundary of an object, and may be used as the basic information to draw the object. In the present embodiment, the PLS may include vertex coordinates, vertex normal coordinates, and so on.

Texture Level Signature (TLS): the TLS represents texture level characteristics. The texture level refers to data or signals regarding the texture that would be used in rendering. For example, texture operation is performed in the fragment shader module in the pipeline. In the present embodiment, the texture usage may be obtained by querying in advance before, for example, rasterization. The texture usage may include, such as, texture identification and texture address that would be used in the current frame. When the texture usage is changed in the frame, the information about the texture obtained through in-advance query will also be different.

In the present embodiment, a signature value may be computed by the signature value computation unit 2042 for each of the CLS, SLS, OLS, PLS and TLS levels to represent a tile, and a summary signature value may further be computed based on the CLS, SLS, OLS, PLS and TLS values. An advantage provided in the present embodiment is the minimum requirement of the storage space as well as the required computation time of the signature values.

Figure 4:
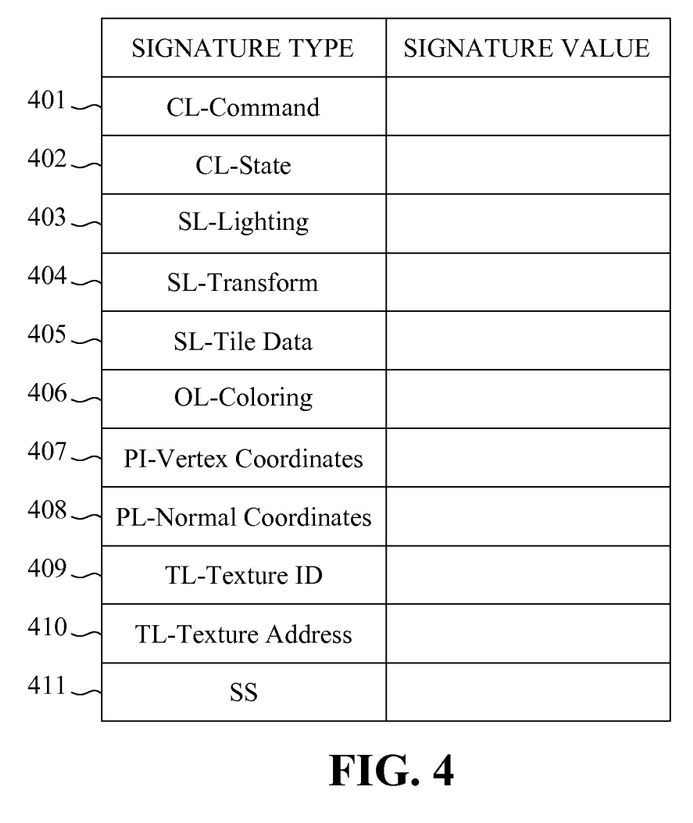
FIG. 4 shows schematic view of a storage scheme for the signature value repository according to another exemplary embodiment.

It should be noted that the signature value repository 2043 may also be realized with other storage schemes, for example, to include more sub-types and categories of signature values for further detailed differentiation. FIG. 4 shows schematic view of a storage scheme for the signature value repository according to another exemplary embodiment. As shown in FIG. 4, the signature values computed and stored for each tile include: a CL-Command 401, a CL-State 402, an SL-Lighting 403, an SL-Transform 404, an SL-Tile Data 405, an OL-Coloring 406, a PL-Vertex Coordinates 407, a PL-Normal Coordinates 408, a TL-Texture ID 409, a TL-Texture Address 410, and a Summary Signature (SS) 411. In this embodiment, the more signature values are computed and stored to provide finer granularity of signature values when comparing tiles.

The following describes each sub-type signature values in details. The CL-Command 401 is the count of GL command that is fed to the GL API; the CL-State 402 is the state that GL command indicates; the SL-Lighting 403 is an lighting matrix used in rendering, such as, ambient lighting, diffuse lighting, specular lighting, emission lighting, shininess lighting and related lighting states (i.e., number of light, strength of light, color of light); the SL-Transform 404 is the view transformation, where a change of viewport also entails change of relative location of each component in the frame; the SL-Tile 405 data represents the output of tile engine 2041, such as, the count of triangles, and the content of the triangles, and so on; the OL-Coloring 406 represents how the fog effect applies, such as, fog mode, fog coloring value, density, and so on; the PL-Vertex coordinate 407 is the coordinates of each vertex; the PL-Normal coordinate 408 is the coordinates of each vertex normal; the TL-Texture ID 409 is the numbering of current use of texture; and the TL-Texture address 410 is the actual location of texture use in the memory, wherein the address can be a physical address or logical mapping address with reference base address.

The present embodiment uses the above storage scheme to enable a strict control over the hardware units for successive operation after the tile comparison unit 2044, i.e., the rasterizer 205, fragment shader 206, depth stencil 207, color buffer blender 208, dither unit 209 and frame buffer 210. After the current tile is determined to require rendering based on the comparison result, the hardware units in the pipeline may be enabled according to the information stored in the above scheme.

It should be noted that a hybrid storage scheme may also be used. For example, the CLS, SLS and OLS include only a single signature value for each, while the PLS and TLS include two signature values respectively to provide finer details. As such, the actual storage scheme may be selected according to the available storage resource.

Figure 5:
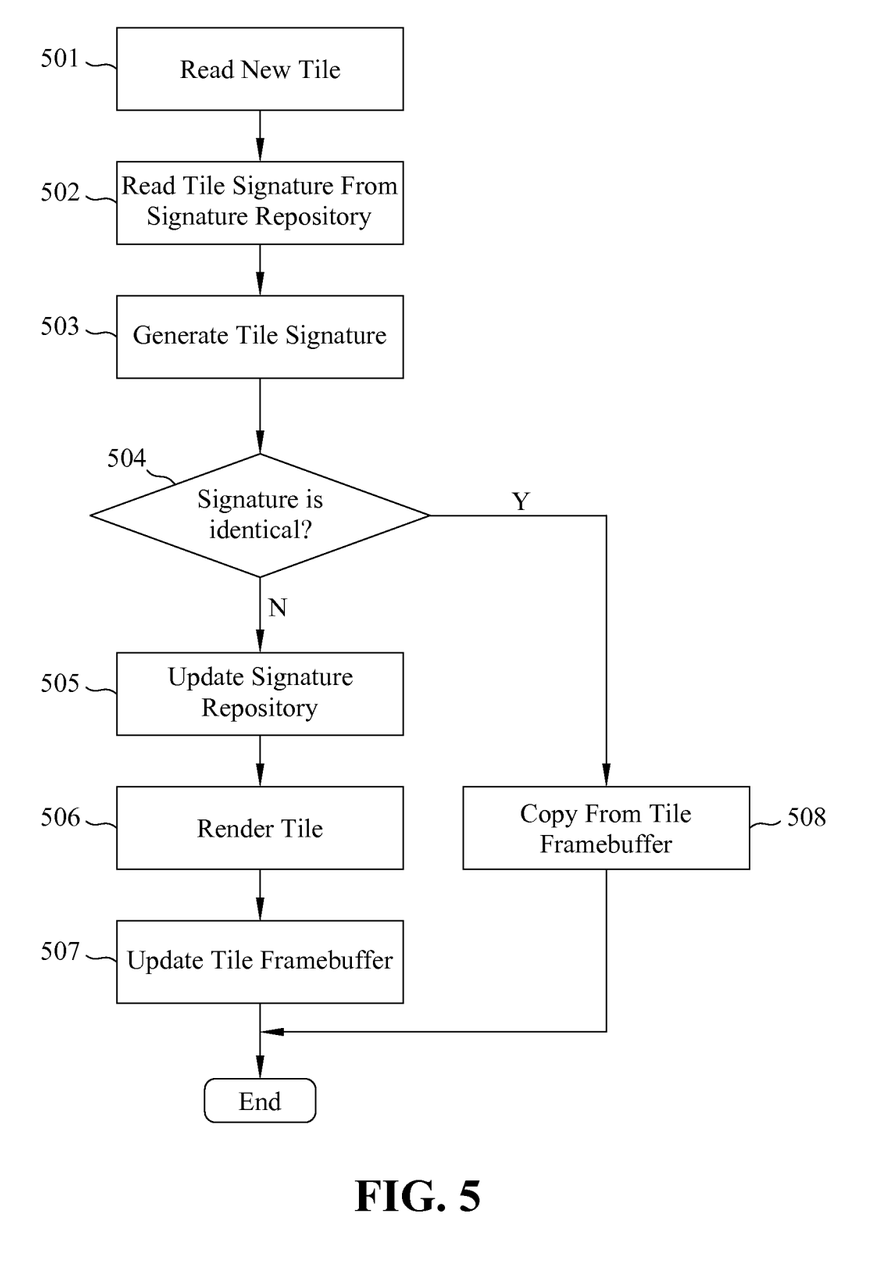
FIG. 5 shows a flowchart of a method for tile elimination according to an exemplary embodiment.

FIG. 5 shows a flowchart of a method for tile elimination according to an exemplary embodiment. The method is executed on the tile-elimination module 204 in FIG. 2. As shown in FIG. 5, step 501 is to read in data of a new tile. In step 502, the signature values corresponding to the new tile in the previous frame are read from the signature value repository 2043, and in step 503, the signature value computation unit 2041 generates signature values for the new tile. It should be noted that the signature values read from the signature value repository 2043 belong to the same tile in the previous frame; and the signature values generated by the signature value computation unit 2041 belong to the same tile in the current frame. In step 504, the tile comparison unit 2044 compares the read signature values and the generated signature values of the same tile to determine whether the two sets of signature values are identical. When the two sets of signature values are identical, the tile may be copied directly from the tile frame buffer 210 without rendering, as shown in step 508. In other words, the tile rendering is eliminated to save computation. Otherwise, the signature value repository 2043 is updated with the generated signature values replacing the previously stored signature values, followed by step 506, rendering the tile, i.e., the tile rendering is not eliminated and the rendering process continues following the rasterizer 205 and the subsequent modules shown in FIG. 2. Finally, step 507 is to update the tile frame buffer 210 with the newly rendered tile.

It is worth noting that the signature values read in step 502 and generated in step 503 must be of the same storage scheme so that the comparison may be valid in step 504. For example, when the storage scheme shown in FIG. 3 is selected for the signature value repository 2043, the comparison made in step 504 must include the comparison of signature values CLS 301, SLS 302, OLS 302, PLS 304, TLS 305 and SS 306, respectively. When any of the signature values of CLS 301, SLS 302, OLS 303, PLS 304, TLS 305 and SS 306 is different, the new tile in the current frame is considered different from the same tile in the previous frame. Therefore, the new tile in the current frame must be rendered. Similarly, when the storage scheme shown in FIG. 4 is selected for the signature value repository 2043, the comparison made in step 504 must include the comparison of signature values CL-command 401, CL-state 402, SL-lighting 403, SL-transform 404, SL-tile data 405, OL-coloring 406, PL-vertex coordinates 407, PL-normal coordinates 408, TL-texture ID 409, TL-texture address 410, and summary signature (SS) 411, respectively. When any of the signature values of CL-command 401, CL-state 402, SL-lighting 403, SL-transform 404, SL-tile data 405, OL-coloring 406, PL-vertex coordinates 407, PL-normal coordinates 408, TL-texture ID 409, TL-texture address 410, and summary signature (SS) 411 is different, the new tile in the current frame is considered as different from the same tile in the previous frame.

Figure 6A:
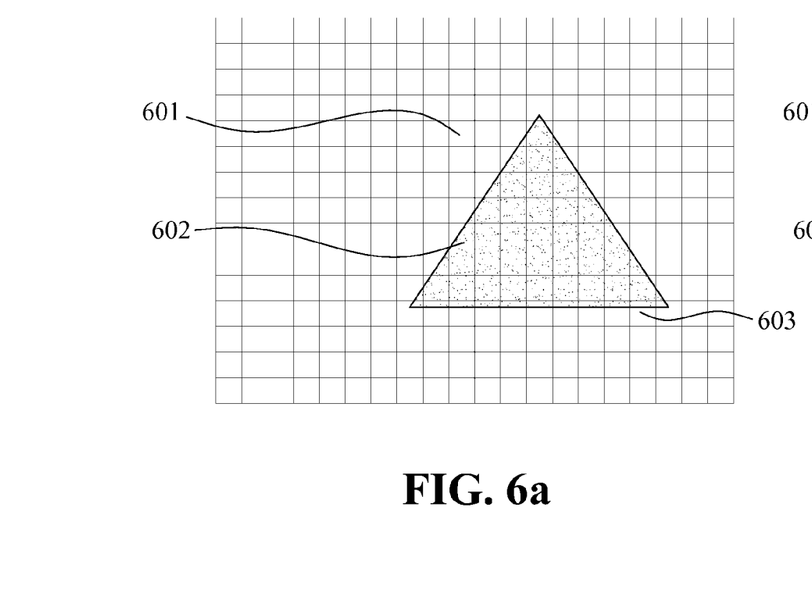
FIGS. 6a-6b show a schematic view of rendering two consecutive frames according to an exemplary embodiment.
Figure 6B:
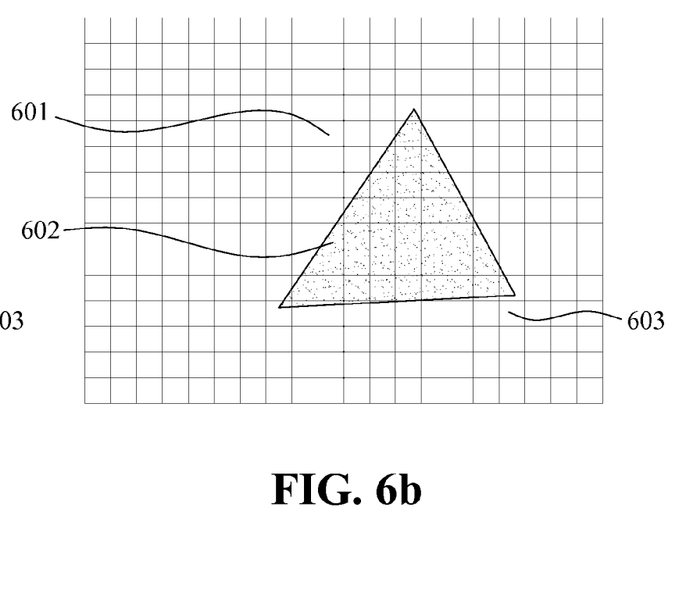

FIGS. 6a and 6b show a schematic view of rendering two consecutive frames according to an exemplary embodiment, where FIG. 6a shows a previous frame and FIG. 6b shows a current frame. As shown in FIGS. 6a and 6b, the tiles 601 in both frames are determined to the identical, and therefore, the tile 601 is not rendered in the second (current) frame. In the case of tile 602 and tile 603, tile 602 and tile 603 in current frame must be rendered because the comparison of the signature values are determined different from the corresponding values computed in the previous frame.

In summary, the disclosure provides apparatus and method for tile elimination in rendering, which utilizes existing parameters and data in GPU to save computation and traffic bandwidth between system and GPU.

An exemplary embodiment describes an apparatus utilizing tile elimination, including, connected in pipeline, an application programming interface (API), a state and vertex shader, a primitive operation unit, a tile-elimination module, a rasterizer, a fragment shader, a depth stencil, a color buffer blender, a dither unit and a frame buffer, wherein the tile-elimination module further includes a tile engine, a signature value computation unit, a signature value repository and a tile comparison unit; wherein the tile engine is connected to the primitive operation unit; the signature value computation unit is connected to API, state and vertex shader, primitive operation unit and tile engine for computing signature values; the signature value repository is connected to the signature value computation unit for storing the signature values computed by the signature value computation unit; and the tile comparison unit is connected to the tile engine and the signature value repository for comparing signature values of a tile of the current frame and the same tile of the previous frame, and for accessing signature values of tiles stored in the signature value repository; the tile comparison unit being also connected to the frame buffer and responsible for determining whether to proceed to render the tile or to signal the frame buffer to copy the previously rendered tile and eliminate the rendering of the tile.

Another embodiment describes a method for tile elimination, including: reading in data of a new tile; reading signature values corresponding to the new tile in the previous frame from a signature value repository; generating signature values for the new tile; comparing the read signature values and the generated signature values of the same tile to determine whether the two sets of signature values being identical; when the two sets of signature values being identical, copying the new tile directly from a tile frame buffer without rendering; otherwise, updating the signature value repository with the generated signature values replacing the stored signature values; rendering the tile; and updating the tile frame buffer with the newly rendered tile.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An apparatus for tile elimination in rendering, comprising:
   a front portion pipeline module, a tile-elimination module, a back portion pipeline module, all connected in a pipeline manner;
   the tile-elimination module further comprising:
   a tile engine, connected to the front portion pipeline module and to generate a list of arrays indicating the processing elements to be rendered on a tile basis;
   a signature value computation unit, connected to the front portion pipeline and the tile engine for computing each of a plurality of signature values corresponding to each of a plurality of signature types from the front portion pipeline module;
   a signature value repository, connected to the signature value computation unit for storing the signature values computed by the signature value computation unit; and
   a tile comparison unit, connected to the tile engine and the signature value repository for comparing signature values of a tile of the current frame and the same tile of a previous frame, and for accessing signature values of tiles stored in the signature value repository;
   the tile comparison unit also responsible for determining whether to eliminate the rendering of the tile in the current frame;
   the tile comparison unit being connected to the back portion pipeline and responsible for determining whether to proceed to render the tile or to copy the tile in the previous frame the back portion pipeline and eliminate the rendering of the tile.

2. The apparatus as claimed in claim 1, wherein the front portion pipeline further comprises
   an application programming interface,
   a state and vertex shader, and
   a primitive operation unit.

3. The apparatus as claimed in claim 1, wherein the back portion pipeline module further comprises
   a rasterizer,
   a fragment shader,
   a depth stencil,
   a color buffer blender,
   a dither unit and
   a frame buffer.

4. The apparatus as claimed in claim 1, wherein the signature values are based on data and parameters from the
   API,
   state and vertex shader,
   primitive operation unit and
   tile engine.

5. The apparatus as claimed in claim 1, wherein the signature value computation unit is a streaming signature value generator with any of, but not limited to, cyclic redundancy check (CRC), and cryptographic hash algorithms MD5, SHA algorithm.

6. The apparatus as claimed in claim 1, wherein
   the tile comparison unit compares the signature values of a tile in a current frame and the signature values of the same tile in a previous frame; and
   when the respective signature values of the tile are the same in the current frame and in the previous frame, the tile is copied from the frame buffer without rendering.

7. The apparatus as claimed in claim 1, wherein
   the tile comparison unit compares the signature values of a tile in a current frame and the signature values of the same tile in a previous frame; and
   when the respective signature values are different for the tile in the current frame and in the previous frame, the tile in the current frame is rendered, the same tile in the previous frame is deleted from the frame buffer.

8. The apparatus as claimed in claim 1, wherein the signature values of a tile comprise
   a command level signature,
   a scene level signature,
   an object level signature,
   a composer level signature, and
   a texture level signature.

9. The apparatus as claimed in claim 1, wherein the signature values of a tile comprise
   a CL-Command,
   a CL-State,
   an SL-Lighting,
   an SL-Transform,
   an SL-Tile Data,
   an OL-Coloring,
   a PL-Vertex Coordinates,
   a PL-Normal Coordinates,
   a TL-Texture ID,
   a TL-Texture Address, and
   a Summary Signature.

10. An apparatus for eliminating tile-rendering, applicable to rendering pipeline having a front portion pipeline module, and back portion pipeline module, to be connected between the front portion pipeline module and the back portion pipeline module in a pipeline manner; the apparatus comprising:
    a tile engine, connected to the front portion pipeline module and to generate a list of arrays indicating the processing elements to be rendered on a tile basis;
    a signature value computation unit, connected to the front portion pipeline and the tile engine for computing each of a plurality of signature values corresponding to each of a plurality of signature types from the front portion pipeline module;
    a signature value repository, connected to the signature value computation unit for storing the signature values computed by the signature value computation unit; and
    a tile comparison unit, connected to the tile engine and the signature value repository for comparing signature values of a tile of the current frame and the same tile of a previous frame, and for accessing signature values of tiles stored in the signature value repository;

the tile comparison unit also responsible for determining whether to eliminate the rendering of the tile in the current frame;

the tile comparison unit being connected to the back portion pipeline and responsible for determining whether to proceed to render the tile or to copy the tile in the previous frame the back portion pipeline and eliminate the rendering of the tile.

11. The apparatus as claimed in claim 10, wherein the front portion pipeline further comprises an application programming interface (API), a state and vertex shader, and a primitive operation unit.

12. The apparatus as claimed in claim 10, wherein the back portion pipeline module further comprises a rasterizer,
a fragment shader,
a depth stencil,
a color buffer blender,
a dither unit and
a frame buffer.

13. A method for tile elimination in rendering, comprising:
reading in data of a new tile;
reading a plurality of signature values corresponding to the new tile from a signature value repository;
generating a plurality of signature values corresponding to a plurality of signature types for the new tile;
comparing the read plurality of signature values and the generated plurality of signature values of the same tile to determine whether the two sets of signature values being identical;
when the two sets of signature values being identical, copying the new tile directly from a tile frame buffer without rendering;
otherwise, updating the signature value repository with the generated signature values replacing the plurality of signature values stored in the signature value repository;
rendering the tile; and
updating the tile frame buffer with the rendered tile.

14. The method as claimed in claim 13, wherein
the read signature values belonging to the same tile in a previous frame; and
the generated signature values belonging to the same tile in a current frame.

15. The method as claimed in claim 13, wherein the signature values of a tile comprise
a command level signature,
a scene level signature,
an object level signature,
a composer level signature, and
a texture level signature.

16. The method as claimed in claim 13, wherein the signature values of a tile comprise
a CL-command,
a CL-state,
an SL-lighting,
an SL-transform,
an SL-tile data,
an OL-coloring,
a PL-vertex coordinates,
a PL-normal coordinates,
a TL-texture ID,
a TL-texture address, and
a summary signature.

* * * * *